United States Patent
Jeong et al.

(10) Patent No.: US 10,256,462 B2
(45) Date of Patent: Apr. 9, 2019

(54) NEGATIVE ELECTRODE FOR SECONDARY BATTERY COMPRISING CMC-LI SALT AND LITHIUM SECONDARY BATTERY COMPRISING THE SAME

(71) Applicant: LG Chem, Ltd., Seoul (KR)

(72) Inventors: Kwang Ho Jeong, Daejeon (KR); Yecheol Rho, Daejeon (KR); Jung Woo Yoo, Daejeon (KR); Je Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 90 days.

(21) Appl. No.: 15/475,671

(22) Filed: Mar. 31, 2017

(65) Prior Publication Data
US 2017/0309896 A1     Oct. 26, 2017

(30) Foreign Application Priority Data

Apr. 22, 2016   (KR) .................. 10-2016-0049607

(51) Int. Cl.
*H01M 4/02* (2006.01)
*H01M 4/36* (2006.01)
*H01M 4/62* (2006.01)
*H01M 10/0525* (2010.01)

(52) U.S. Cl.
CPC ........... *H01M 4/364* (2013.01); *H01M 4/622* (2013.01); *H01M 10/0525* (2013.01); *H01M 2004/027* (2013.01)

(58) Field of Classification Search
CPC .. H01M 4/364; H01M 4/622; H01M 10/0525; H01M 2004/027
See application file for complete search history.

(56) References Cited

U.S. PATENT DOCUMENTS

| 5,721,069 A * | 2/1998 | Shoji | H01M 4/0404 |
| | | | 204/290.11 |
| 2005/0233219 A1* | 10/2005 | Gozdz | H01M 4/13 |
| | | | 429/231.95 |
| 2012/0034505 A1* | 2/2012 | Zhu | H01M 4/133 |
| | | | 429/94 |
| 2015/0030923 A1* | 1/2015 | Koo | C09J 101/286 |
| | | | 429/217 |

FOREIGN PATENT DOCUMENTS

| CN | 103178241 A | * | 6/2013 | |
| JP | 2000082472 A | * | 3/2000 | |
| KR | 20130094738 A | * | 8/2013 | .......... C09J 101/286 |

OTHER PUBLICATIONS

Kil et al.; "Lithium Salt of Carboxymethyl Cellulose as an Aqueous Binder for Thick Graphite Electrode in Lithium Ion Batteries"; Macromolecular Research, vol. 23, No. 8, pp. 719-725 (Available online Jul. 22, 2015) (Year: 2015).*
www.espacenet.com machine translation of the description of CN 103178241A (Jun. 2013) (Year: 2013).*

* cited by examiner

*Primary Examiner* — Gregg Cantelmo
(74) *Attorney, Agent, or Firm* — Lerner, David, Littenberg, Krumholz & Mentlik, LLP

(57) ABSTRACT

Disclosed is a negative electrode for secondary batteries including a negative electrode mix applied to a current collector, the negative electrode mix including a negative electrode active material, a thickening agent and an aqueous binder, wherein the thickening agent is a carboxymethyl cellulose lithium salt (CMC—Li salt) having a substitution degree of a hydroxyl group (—OH) by a carboxymethyl lithium group (—$CH_2COOLi$) of 0.7 to 1.5 and the thickening agent is present in an amount of higher than 0.6% by weight and not higher than 1.4% by weight, with respect to the total weight of the negative electrode mix.

13 Claims, 1 Drawing Sheet

[FIG. 1]
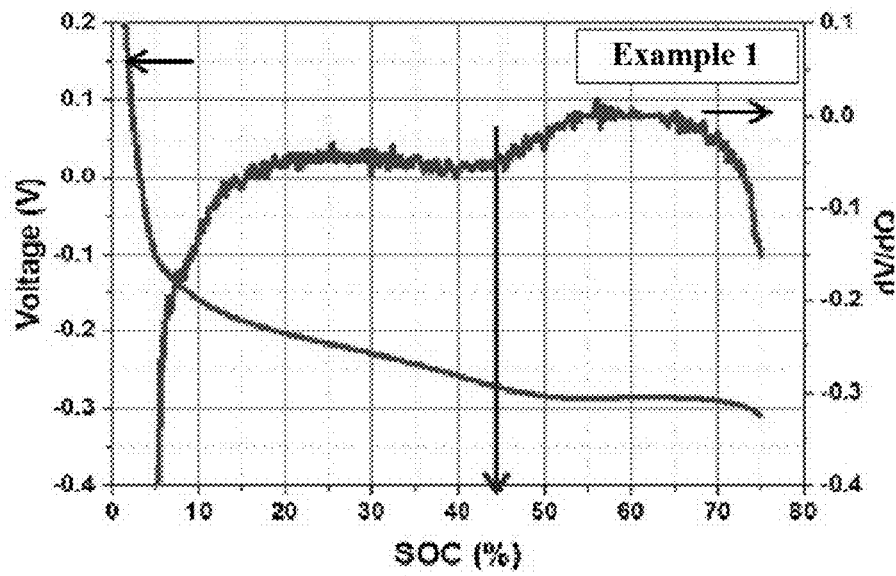
[FIG. 2]
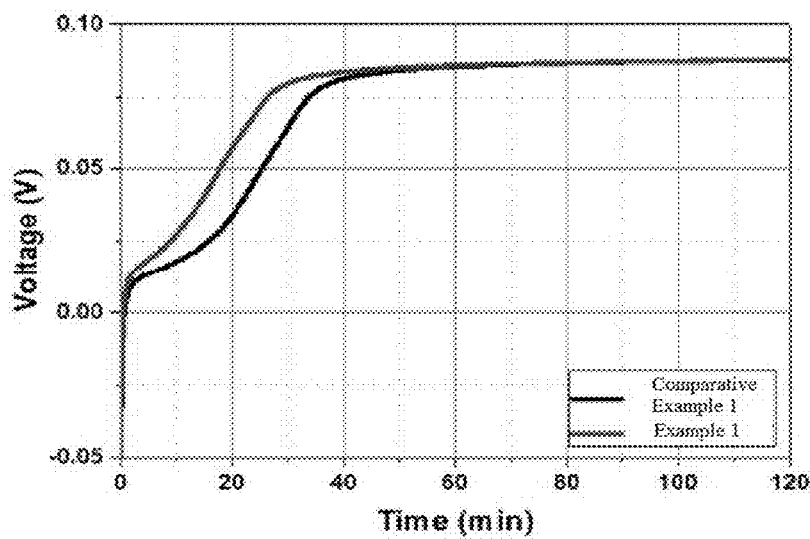

NEGATIVE ELECTRODE FOR SECONDARY BATTERY COMPRISING CMC-LI SALT AND LITHIUM SECONDARY BATTERY COMPRISING THE SAME

CROSS-REFERENCE TO RELATED APPLICATION

This application claims the benefit of Korean Patent Application No. 10-2016-0049607 filed on Apr. 22, 2016 with the Korean Intellectual Property Office, the disclosure of which is herein incorporated by reference in its entirety.

Technical Field

The present invention relates to a negative electrode for secondary batteries including a CMC—Li salt and a lithium secondary battery including the same.

Background Art

The sharply increased use of fossil fuels has led to greater demand for alternative or green (clean) energy. In an attempt to address this, the most actively researched field is generation and accumulation of electricity through electrochemistry.

A representative example of electrochemical devices using electrochemical energy at present is a secondary battery and the usage range thereof is gradually extending.

Recently, technological development and increased demand associated with portable equipment such as portable computers, cellular phones and cameras have brought about a rapid increase in the demand for secondary batteries as energy sources. Among these secondary batteries, lithium secondary batteries having high energy density and operating voltage, long lifespan and low self-discharge rates have been actively researched and are commercially available and widely used.

In addition, with the trends toward advanced performance and miniaturization of electronic devices, the demand for secondary batteries having a high energy density is increasing. As a method of increasing energy density of secondary batteries, loading more electrode active material mix on a current collector is known.

As the amount of electrode active material mix loaded on the current collector increases, rapid charging characteristics and the like are disadvantageously deteriorated due to increased movement distance of lithium ions in the electrode. When rapid charging characteristics are deteriorated in spite of increased energy density, commercial availability may be deteriorated.

Accordingly, there is an urgent need for technologies to maintain or improve rapid charging characteristics to a predetermined level or more although the loading amount on electrodes is increased.

DISCLOSURE

Technical Problem

Therefore, the present invention has been made to solve the above and other technical problems that have yet to be resolved.

As a result of a variety of intensive studies and various experiments, as described below, the inventors of the present application found that rapid charge characteristics of secondary batteries are improved when a carboxymethyl cellulose lithium salt (CMC—Li salt) having a substitution degree of a hydroxyl group (—OH) by a carboxymethyl lithium group (—CH$_2$COOLi) of 0.7 to 1.5 is used as a thickening agent and the thickening agent is present in an amount of higher than 0.6% by weight and not higher than 1.4% by weight, with respect to the total weight of the negative electrode mix. Based on this finding, the present invention has been completed.

Technical Solution

In accordance with an aspect of the present invention, provided is a negative electrode for secondary batteries including a negative electrode mix including a negative electrode active material, a thickening agent and an aqueous binder applied to a current collector, wherein the thickening agent is a carboxymethyl cellulose lithium salt (CMC—Li salt) having a substitution degree of a hydroxyl group (—OH) by a carboxymethyl lithium group (—CH$_2$COOLi) of 0.7 to 1.5 and the thickening agent is present in an amount of higher than 0.6% by weight and not higher than 1.4% by weight, with respect to the total weight of the negative electrode mix.

Conventional CMC is generally used in the form of a CMC—Na salt including a carboxymethyl sodium group (—CH$_2$COONa). The CMC—Na salt is effective in improving overall performance of secondary batteries as a binder, but have limitation on lifespan characteristics, discharge characteristics, negative electrode efficiency and increase of solid contents in the manufacturing process.

According to the present invention, when the CMC—Li salt is used as a thickening agent, as compared to when a conventional CMC—Na salt is used, lifespan characteristics, discharge characteristics and negative electrode efficiency of secondary batteries and solid contents in the manufacturing process can be advantageously improved. In particular, when the carboxymethyl cellulose lithium salt (CMC—Li salt) has a substitution degree of a hydroxyl group (—OH) by carboxymethyl lithium group (—CH$_2$COOLi) of 0.7 to 1.5 and the content of the thickening agent is higher than 0.6% by weight and not higher than 1.4% by weight, with respect to the total weight of the negative electrode mix, rapid charge characteristics of the secondary battery can be significantly improved.

Specifically, the content of the thickening agent may be 0.8% by weight to 1.2% by weight, with respect to the total weight of the negative electrode mix.

When the content of the thickening agent is less than 0.6% by weight, with respect to the total weight of the negative electrode mix, rapid charge characteristics may be deteriorated, as compared to when the CMC—Na salt is used as the thickening agent, and when the content is higher than 1.4% by weight, energy density may be deteriorated due to decreased content of active material in the electrode.

Meanwhile, as the amount of negative electrode mix loaded on the current collector increases, lithium may be partially precipitated in the negative electrode during rapid charge due to increased movement distance of lithium ions in the electrode, charging may be finished owing to increased voltage before lithium ions are sufficiently moved. As a result, charge capacity may be decreased. That is, rapid charge characteristics may be significantly deteriorated. This phenomenon may become more serious as the amount of negative electrode mix loaded increases.

In a specific embodiment, the amount of negative electrode mix loaded may be not less than 200 mg/25 cm$^2$ and less than 500 mg/25 cm$^2$, specifically, 300 mg/25 cm$^2$ to 400 mg/25 cm$^2$.

When the amount of negative electrode mix loaded is higher than 200 mg/25 cm$^2$, rapid charge characteristics are known to be significantly deteriorated due to high amount of mix loaded on the electrode. When the amount of negative electrode mix loaded is less than 200 mg/25 cm$^2$, the necessity of improving rapid charge characteristics is lessened due to low amount of mix loaded on the electrode and the effect of improving rapid charge characteristics may be lessened, as compared to when the CMC—Na salt is used. When the amount of negative electrode mix loaded is not less than 500 mg/25 cm$^2$ as well, it is certain that the effect of improving rapid charge characteristics can be obtained, as compared to when the CMC—Na salt is used. In this case, it may be difficult to secure rapid charge characteristics to a commercially available level due to excessively long movement distance of lithium ions.

In a specific embodiment, the substitution degree of the carboxymethyl lithium group in the CMC—Li salt may be 0.8 to 1.4. When the substitution degree is not within the range, the ability of the thickening agent to increase viscosity may be deteriorated and the effect of improving rapid charge characteristics may be lowered.

Meanwhile, the CMC—Li salt may have a number average molecular weight of $70 \times 10^4$ to $500 \times 10^4$ and a molecular weight of $120 \times 10^4$ to $350 \times 10^4$. When the number average molecular weight is less than $70 \times 10^4$, a great amount of thickening agent is consumed due to insufficient effect of viscosity increase, and when the number average molecular weight exceeds $500 \times 10^4$, it is not easy to control viscosity and improvement of rapid charging characteristics may be insufficient.

In a specific embodiment, the viscosity of slurry for the negative electrode mix to be applied to the current collector is not limited and may be 500 cps to 10,000 cps when measured at 23° C. and 12 rpm with a B-type viscometer.

Meanwhile, the aqueous binder may be styrene-butadiene rubber (SBR). SBR, which serves as an aqueous binder, can remove the necessity of using an organic solvent because it can be dispersed in water in the form of an emulsion, and can reduce the content of binder and increase the content of the negative electrode active material due to strong adhesive strength, thus being advantageous in increasing capacity of lithium secondary batteries. In particular, when the CMC—Li salt is used in combination with SBR as the thickening agent, the ratio of active material to a predetermined volume of the negative electrode mix can be further increased, thereby leading to effects of acquiring high capacity, improving electrode processability due to increased solids content of negative electrode slurry and alleviating swelling.

In a case in which the CMC—Li salt is used as the thickening agent, when SBR having a predetermined range of particle diameter is used, performance of secondary batteries can be further improved. In a specific embodiment, the SBR may have a particle diameter of 90 nm to 500 nm, specifically, 100 nm to 400 nm.

In addition, in a specific embodiment, a content ratio of the thickening agent to the aqueous binder on a weight basis may be 1:2 to 5:1, specifically 1:1 to 4:1, more specifically not less than 1:1 and less than 2:1.

According to the present invention, the negative electrode active material may be selected from negative electrode active materials generally used for lithium secondary batteries, without limitation. For example, the negative electrode active material may include: carbons such as incompletely-graphitized carbon and graphite-based carbon; metal composite oxides such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb, Ge; Me': Al, B, P, Si, Group I, Group II and Group III elements, halogens; $0 \leq x \leq 1$; $1 \leq y \leq 3$; and $1 \leq z \leq 8$); lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

All negative electrode active materials do not exert the same effects and among the negative electrode active materials, the carbon-based material can exert the most excellent effects. Specifically, the carbon-based material may include at least one selected from the group consisting of graphite-based carbon, coke-based carbon, soft carbon and hard carbon.

This natural graphite can be produced in the form of a sphere by grinding and assembling a scaly natural graphite raw material and the produced spherical natural graphite can reduce an electrolyte decomposition reaction on the active material surface due to minimized specific surface area. Accordingly, when the spherical assembled natural graphite is used in combination with scaly natural graphite, the packing density of the electrode can be increased and energy density can be improved.

More specifically, the negative electrode active material may be natural graphite and/or artificial graphite.

Meanwhile, the negative electrode mix may further include a conductive material and/or a filler.

The conductive material is typically added in an amount of 1 to 30% by weight, based on the total weight of the mixture including the negative electrode active material. Any conductive material may be used without particular limitation so long as it has suitable conductivity without causing adverse chemical changes in the battery. Examples of the conductive material include graphite; carbon black such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and conductive materials such as polyphenylene derivatives. Examples of commercially available conductive materials include acetylene black-based products available from Chevron Chemical Company, Denka Singapore Private Limited, Gulf Oil Company and the like, Ketjen black, EC series available from Armak Company Inc., Vulcan XC-72 available from Cabot Company, and Super P available from Timcal Ltd., and the like.

The filler may be optionally added to suppress expansion of the electrode. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

In a specific embodiment, there is no particular limit as to the negative electrode current collector, so long as it has suitable conductivity without causing adverse chemical changes in the fabricated battery. Examples of the negative electrode current collector include copper, stainless steel, aluminum, nickel, titanium, sintered carbon, and copper or stainless steel surface-treated with carbon, nickel, titanium, silver or the like, aluminum-cadmium alloys and the like. In addition, similar to the positive electrode current collector, if necessary, the negative electrode current collector may be processed to form fine irregularities on the surface thereof so as to enhance adhesion of the negative electrode active material. In addition, the current collector may be used in various forms including films, sheets, foils, nets, porous structures, foams and non-woven fabrics.

According to the present invention, the thickness of the negative electrode current collector may be uniform within the range of 3 to 201 μm, but it can be sometimes different.

In addition, the present invention provides a secondary battery including the negative electrode.

In a specific embodiment, the secondary battery undergoes lithium (Li) plating, when SOC (state of charge) exceeds 35% during rapid charge at 1.5 C-rate. When lithium plating occurs in an early stage of charge, movement of lithium ions to the negative electrode active material is suppressed and packing density is thus decreased. Accordingly, in a case in which rapid charging is conducted, it is more preferable to have lithium plating occur as late as possible and to conduct rapid charging only before lithium plating occurs and, after then, to conduct slow charging so as to avoid lithium plating. Because the secondary battery according to the present invention undergoes lithium plating when SOC exceeds 35%, rapid charge can be conducted at least up to SOC of 35% so that the secondary battery can be more rapidly charged while maintaining packing density.

Meanwhile, an example of a method to evaluate rapid charge characteristics is to measure an SOC level at which lithium plating occurs. Another method is that SOC at which voltage plateau starts to occur is measured at 1.5 C-rate or more, charging is conducted at the corresponding C-rate until SOC reaches 70 and a voltage restoration ratio of the battery is measured in a rest condition where no current is applied. Obviously, it is considered that measured SOC and restoration speed are proportional to rapid charge characteristics.

As the amount of negative electrode loaded increases, SOC at which lithium plating occurs generally decreases in proportion to the loading amount. Accordingly, in order to more objectively evaluate rapid charge characteristics of secondary batteries, lithium plating should be evaluated with respect to the amount loaded on the negative electrode.

Meanwhile, the secondary battery includes a positive electrode, a negative electrode, a separator membrane and an electrolyte. Hereinafter, other ingredients of the secondary battery will be described.

The positive electrode is for example produced by applying a positive electrode mix including a positive electrode active material, a conductive material and a binder to a positive electrode current collector. If necessary, the positive electrode mix may further include a filler.

The positive electrode current collector is generally fabricated to a thickness of 3 to 201 μm. There is no particular limit as to the positive electrode current collector, so long as it has excellent conductivity without causing adverse chemical changes in the fabricated battery. Examples of the positive electrode current collector include stainless steel, aluminum, nickel, titanium, and aluminum or stainless steel surface-treated with carbon, nickel, titanium or silver, specifically aluminum. The current collector may also be processed to form fine irregularities on the surface thereof so as to enhance adhesion to the positive electrode active material. In addition, the current collector may be used in various forms including films, sheets, foils, nets, porous structures, foams and non-woven fabrics.

Examples of the positive electrode active material may include, but are not limited to, layered compounds such as lithium cobalt oxide ($LiCoO_2$) and lithium nickel oxide ($LiNiO_2$), or their compounds substituted by one or more transition metals; lithium manganese oxides such as compounds represented by $Li_{1+x}Mn_{2-x}O_4$ (in which $0 \leq x \leq 0.33$), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ and $Cu_2V_2O_7$; Ni-site type lithiated nickel oxides represented by $LiNi_{1-x}M_xO_2$ (M=Co, Mn, Al, Cu, Fe, Mg, B or Ga, and $0.01 \leq x \leq 0.3$); lithium manganese composite oxides represented by $LiMn_{2-x}M_xO_2$ (M=Co, Ni, Fe, Cr, Zn or Ta, and $0.01 \leq x \leq 0.1$), or $Li_2Mn_3MO_8$ (M=Fe, Co, Ni, Cu or Zn); $LiMn_2O_4$ wherein Li is partially substituted by alkaline earth metal ions; disulfide compounds; and $Fe_2(MoO_4)_3$.

The binder is a component assisting in binding between an active material and a conductive material and in binding of the active material to a current collector. The binder is typically added in an amount of 1 to 30% by weight, with respect to the total weight of the mixture including the positive electrode active material. Examples of the binder include polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene propylene diene terpolymers (EPDM), sulfonated EPDM, styrene butadiene rubber, fluororubber and various copolymers.

In a specific embodiment, the separator membrane may be a polyolefin-based film commonly used in the art and is for example a sheet including at least one selected from the group consisting of high-density polyethylene, low-density polyethylene, linear low-density polyethylene, ultra-high molecular weight polyethylene, polypropylene, polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalate and a mixture thereof.

The separator membrane may be composed of one material, but the present invention is not limited thereto. Accordingly, the separator membrane may be composed of different materials according to stability, energy density and overall performance of battery cells.

There is no particular limitation as to pore size and porosity of the separator membrane or separator film. However, the porosity may range from 10 to 95% and the pore size (diameter) may range from 0.1 to 50 μm. When the pore size and porosity are less than 0.1 μm and 10%, respectively, the separator membrane acts as a resistance layer and when the pore size and porosity exceed 50 μm and 95%, respectively, it is difficult to maintain mechanical properties.

The electrolyte may be a lithium salt-containing non-aqueous electrolyte which includes a non-aqueous electrolyte and a lithium salt. As the non-aqueous electrolyte, a non-aqueous organic solvent, an organic solid electrolyte, an inorganic solid electrolyte or the like may be utilized, but the present invention is not limited thereto.

Examples of the non-aqueous organic solvent include non-protic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, chloroborane lithium, lower aliphatic carboxylic acid lithium, lithium tetraphenyl borate, imides and the like.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include a halogen-containing solvent such as carbon tetrachloride and ethylene trifluoride. Further, in order to improve high-temperature storage characteristics, the non-aqueous electrolyte may further include carbon dioxide gas and may further include fluoro-ethylene carbonate (FEC), propene sultone (PRS) or the like.

In a specific embodiment, for example, the lithium salt-containing non-aqueous electrolyte can be prepared by adding a lithium salt such as $LiPF_6$, $LiClO_4$, $LiBF_4$ or $LiN(SO_2CF_3)_2$ to a mixed solvent of cyclic carbonate such as EC or PC as a highly dielectric solvent and linear carbonate such as DEC, DMC or EMC as a low-viscosity solvent.

The present invention provides a battery pack including the secondary battery as a unit battery and a device including the battery pack as a power source.

Examples of the device include, but are not limited to, notebook computers, netbooks, tablet PCs, cellular phones, MP3s, wearable electronic devices, power tools, electric vehicles (EVs), hybrid electric vehicles (HEVs), plug-in hybrid electric vehicles (PHEVs), electric bikes (E-bikes), electric scooters (E-scooters), electric golf carts, power storage systems and the like.

The configuration and manufacturing methods of these devices are well-known in the art and a detailed explanation thereof will be omitted herein.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a graph showing an SOC at which lithium plating occurs in a secondary battery according to an embodiment of the present invention; and FIG. 2 is a graph showing a relaxation time after lithium plating occurs in the secondary battery according to an embodiment of the present invention.

BEST MODE

Now, the present invention will be described in more detail with reference to examples. These examples are provided only for better understanding of the present invention and should not be construed as limiting the scope of the present invention.

EXAMPLE 1

1-1 Preparation of Thickening Agent

LiOH and monochloroacetic acid (MCA) were added to cellulose to prepare a CMC—Li salt having a substitution degree of a hydroxyl group (—OH) by carboxymethyl lithium group (—$CH_2COOLi$) of 1.0 and a number average molecular weight of less than 200.

1-2 Production of Negative Electrode

A CMC—Li salt prepared in 1-1 as a thickening agent, SBR having a particle size of 200 nm as an aqueous binder, natural graphite as a negative electrode active material, and acetylene black as a conductive material were mixed in a weight ratio of binder:thickening agent:negative electrode active material:conductive material =1:1:97.5:0.5 and water was added as a solvent to prepare a negative electrode mix slurry having a slurry viscosity of 1,500 cps. The negative electrode mix slurry was applied to the copper current collector at a loading amount of 300 mg/25 $cm^2$, and the copper current collector was dried in a vacuum oven at 120° C. for 2 hours to produce a negative electrode.

1-3 Manufacture of Secondary Battery (Coin Half Cell)

A half coin cell was manufactured using the negative electrode produced in 1-2 as a negative electrode, using Li metal as a positive electrode and using a 1M solution of $LiPF_6$ in a solvent consisting of ethylene carbonate (EC) and dimethyl carbonate (DMC) in a volume ratio of 1:1 as an electrolyte.

EXAMPLE 2

A secondary battery was manufactured in the same manner as in Example 1, except that a negative electrode mix was prepared in a weight ratio of binder:thickening agent:negative electrode active material:conductive material=1:1.2:97.3:0.5 in the process of producing the electrode.

EXAMPLE 3

A secondary battery was manufactured in the same manner as in Example 2, except that artificial graphite was used as the negative electrode active material, instead of natural graphite.

COMPARATIVE EXAMPLE 1

A secondary battery was manufactured in the same manner as in Example 1, except that a CMC—Na salt was used as the thickening agent, instead of the CMC—Li salt.

COMPARATIVE EXAMPLE 2

A secondary battery was manufactured in the same manner as in Example 2, except that a CMC—Na salt was used as the thickening agent, instead of the CMC—Li salt.

COMPARATIVE EXAMPLE 3

A secondary battery was manufactured in the same manner as in Example 3, except that a CMC—Na salt was used as the thickening agent, instead of the CMC—Li salt.

COMPARATIVE EXAMPLE 4

A secondary battery was manufactured in the same manner as in Example 1, except that a negative electrode mix was prepared in a weight ratio of binder:thickening agent: negative electrode active material:conductive material=1: 0.6:97.9:0.5 in the process of producing the electrode.

COMPARATIVE EXAMPLE 5

A secondary battery was manufactured in the same manner as in Comparative Example 4, except that a CMC—Na salt was used as the thickening agent, instead of the CMC—Li salt.

EXAMPLE 4

A secondary battery was manufactured in the same manner as in Example 1, except that the negative electrode mix slurry was applied to the negative electrode at a loading amount of 200 mg/25 $cm^2$.

COMPARATIVE EXAMPLE 6

A secondary battery was manufactured in the same manner as in Example 4, except that a CMC—Na salt was used as the thickening agent, instead of the CMC—Li salt.

EXAMPLE 5

A secondary battery was manufactured in the same manner as in Example 1, except that the negative electrode mix slurry was applied to the negative electrode at a loading amount of 200 mg/25 $cm^2$ in Example 2.

COMPARATIVE EXAMPLE 7

A secondary battery was manufactured in the same manner as in Example 5, except that a CMC—Na salt was used as the thickening agent, instead of the CMC—Li salt.

EXAMPLE 6

A secondary battery was manufactured in the same manner as in Example 1, except that the negative electrode mix slurry was applied to the negative electrode at a loading amount of 350 mg/25 $cm^2$ in Example 2.

COMPARATIVE EXAMPLE 8

A secondary battery was manufactured in the same manner as in Example 6, except that a CMC—Na salt was used as the thickening agent, instead of the CMC—Li salt.

EXAMPLE 7

A secondary battery was manufactured in the same manner as in Example 1, except that the negative electrode mix slurry was applied to the negative electrode at a loading amount of 400 mg/25 $cm^2$ in Example 2.

COMPARATIVE EXAMPLE 9

A secondary battery was manufactured in the same manner as in Example 7, except that a CMC—Na salt was used as the thickening agent, instead of the CMC—Li salt.

EXAMPLE 8

A secondary battery was manufactured in the same manner as in Example 1, except that the negative electrode mix slurry was applied to the negative electrode at a loading amount of 500 mg/25 $cm^2$ in Example 2.

COMPARATIVE EXAMPLE 10

A secondary battery was manufactured in the same manner as in Example 8, except that a CMC—Na salt was used as the thickening agent, instead of the CMC—Li salt.

TEST EXAMPLE 1

Point at which Lithium Plating Occurs

While charging secondary batteries manufactured in accordance with Examples 1 to 8 and Comparative Examples 1 to 10 until SOC reached about 80% by applying a current of 1.5 C-rate thereto, voltage variation and dV/dQ according to SOC were measured.

FIG. 1 is a graph showing voltage variation and dV/dQ according to SOC in Example 1. Referring to FIG. 1, voltage plateau according to SOC can be checked and lithium plating occurs in the corresponding area. In addition, so as to more accurately measure a point at which lithium plating occurs, a dV/dQ graph according to SOC can be used. It can be seen that lithium plating occurs at the point at which the second peak among two peaks protruding upward starts. An accurate point where lithium plating occurs was confirmed by detecting voltage plateau according to SOC and peaks of the dV/dQ graph according to SOC.

Through these methods, lithium plating occurrence points of secondary batteries manufactured in accordance with Examples 1 to 3 and Comparative Examples 1 to 5 were confirmed. Results are shown in the following Table 1.

TEST EXAMPLE 2

Relaxation Time

A relaxation time taken for a voltage to be relaxed in a rest condition that current was not applied for 2 hours was measured for secondary batteries of Examples 1 to 8 and Comparative Examples 1 to 10 having been charged at 1.5 C-rate up to SOC of 80% through testing to check points, at which lithium plating occurs, as in Test Example 1.

FIG. 2 is a graph comparatively showing a relaxation time between Example 1 and Comparative Example 1. As plated lithium is lithiated in the rest condition, the voltage of secondary batteries is slowly increased. The amount of plated lithium can be compared by measuring the relaxation time taken for the voltage to be relaxed. As the amount of plated lithium decreases, the time taken for the voltage to be relaxed decreases, and when the amount of plated lithium increases, the relaxation time increases.

Through this method, relaxation times of secondary batteries manufactured in accordance with Examples 1 to 3 and Comparative Examples 1 to 5 were checked and results are shown in the following Table 1.

Test Example 3
1.5 C-Rate/0.5 C-rate SOC 80% Assessment Method

The secondary batteries manufactured in accordance with Examples 1 to 8 and Comparative Examples 1 to 10 were rapidly charged up to SOC involving occurrence of lithium plating by applying a current of 1.5 C-rate thereto and the time taken for the secondary batteries to be charged up to SOC of 80% was measured by applying a current of 0.5 C-rate thereto. Results are shown in the following Table 1.

TABLE 1

| | Negative electrode active material and thickening agent | Content of thickening agent (%) | Amount of negative electrode loaded (mg/25 cm$^2$) | Lithium plating SOC (%) | Relaxation time (min) | 1.5 C/0.5 C SOC80% charge time (min) |
|---|---|---|---|---|---|---|
| Example 1 | Natural graphite CMC-Li | 1.0 | 300 | 45 | 47 | 60 |
| Example 2 | Natural graphite CMC-Li | 1.2 | 300 | 46 | 45 | 59 |
| Example 3 | Artificial graphite CMC-Li | 1.2 | 300 | 39 | 57 | 65 |
| Comparative Example 1 | Natural graphite CMC-Na | 1.0 | 300 | 38 | 50 | 66 |
| Comparative Example 2 | Natural graphite CMC-Na | 1.2 | 300 | 35 | 62 | 68 |
| Comparative Example 3 | Artificial graphite CMC-Na | 1.2 | 300 | 34 | 66 | 69 |
| Comparative Example 4 | Natural graphite CMC-Li | 0.6 | 300 | 34 | 53 | 69 |
| Comparative Example 5 | Natural graphite CMC-Na | 0.6 | 300 | 39 | 50 | 65 |
| Example 4 | Natural graphite CMC-Li salt | 1.0 | 200 | 60 | 29 | 48 |
| Comparative Example 6 | Natural graphite CMC-Na salt | 1.0 | 200 | 59 | 30 | 49 |
| Example 5 | Natural graphite CMC-Li salt | 1.2 | 200 | 61 | 29 | 47 |
| Comparative Example 7 | Natural graphite CMC-Na salt | 1.2 | 200 | 58 | 30 | 49 |
| Example 6 | Natural graphite CMC-Li salt | 1.2 | 350 | 33 | 64 | 70 |
| Comparative Example 8 | Natural graphite CMC-Na salt | 1.2 | 350 | 25 | 76 | 76 |
| Example 7 | Natural graphite CMC-Li salt | 1.2 | 400 | 18 | 80 | 82 |
| Comparative Example 9 | Natural graphite CMC-Na salt | 1.2 | 400 | 15 | 92 | 84 |
| Example 8 | Natural graphite CMC-Li salt | 1.2 | 500 | — | — | — |
| Comparative | Natural | 1.2 | 500 | — | — | — |

TABLE 1-continued

| Negative electrode active material and thickening agent | Content of thickening agent (%) | Amount of negative electrode loaded (mg/25 cm²) | Lithium plating SOC (%) | Relaxation time (min) | 1.5 C/0.5 C SOC80% charge time (min) |
|---|---|---|---|---|---|
| Example 10 graphite CMC-Na salt | | | | | |

Comparing Examples 1 to 3 with Comparative Examples 1 to 3 with reference to Table 1, when the CMC—Li salt is used as the thickening agent, instead of the CMC—Na salt, lithium plating occurs at a point where SOC exceeds 35%, but, when the CMC—Na salt is used, lithium plating occurs at a point where SOC is 35% or less. That is, when the CMC—Li salt is used, lithium plating occurs late, based on SOC, in spite of rapid charging, and rapid charge characteristics are thus significantly improved.

In addition, in Examples 1 to 3, relaxation time is further shortened, as compared to Comparative Examples 1 to 3 conducted under the same conditions, respectively. That is, when the CMC—Li salt is used, the amount of lithium plated significantly decreases, in spite of rapid charging, as compared to when the CMC—Na salt is used. From this, it can be seen that the CMC—Li salt significantly improves rapid charge characteristics.

Furthermore, comparing Examples 1 to 3 with Comparative Examples 1 to 3 conducted under the same conditions, respectively, when the CMC—Li salt is used as the thickening agent, 1.5 C-rate/0.5 C-rate SOC 80% charge time is shortened. That is, obviously, when the CMC—Li salt is used, the time taken to get SOC of 80% can be shortened by rapid charging, as compared to when the CMC—Na salt is used.

Meanwhile, comparing Comparative Example 4 with Comparative Example 5, in Comparative Example 4, although the CMC—Li salt is used, lithium plating occurs earlier, relaxation time is longer and 1.5 C-rate/0.5 C-rate SOC 80% charge time is longer, as compared to Comparative Example 5 where the CMC—Na salt is used under the same conditions. That is, although the CMC—Li salt is used instead of the CMC—Na salt, rapid charge characteristics are not improved in all cases and rapid charge characteristics are improved only when the content of CMC—Li salt exceeds 0.6% by weight, with respect to the total weight of the negative electrode mix.

Comparing Examples 4 to 8 with Comparative Examples 6 to 10, it can be seen that, when the negative electrode mix is loaded in a high amount of 200 mg/25 cm² or more and CMC—Li is used instead of CMC—Na, rapid charge characteristics are improved. In Example 8 and Comparative Example 10, it is certain that Example 8 exhibits better rapid charge characteristics than Comparative Example 10, but it involves lithium plating much earlier under the same test conditions as in other examples due to extremely high loading amount (500 mg/25 cm²) of the negative electrode mix. As a result, rapid charge characteristics could not be measured. This indicates that, when the amount of negative electrode mix loaded is 500 mg/25 cm² or more, rapid charge characteristics are improved by using CMC—Li, instead of CMC—Na, but this improvement does not reach a commercially applicable level.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the fore-going, the negative electrode according to the present invention includes, as a thickening agent, a carboxymethyl cellulose lithium salt (CMC—Li salt) having a substitution degree of a hydroxyl group (—OH) by a carboxymethyl lithium group (—CH$_2$COOLi) of 0.7 to 1.5 in an amount of higher than 0.6% by weight and not higher than 1.4% by weight, with respect to the total weight of the negative electrode mix, thereby significantly improving rapid charge characteristics.

The invention claimed is:

1. A negative electrode for secondary batteries, comprising:
   a current collector; and
   a negative electrode mix disposed on the current collector, the negative electrode mix comprising a negative electrode active material, a thickening agent and an aqueous binder,
   wherein the thickening agent is a carboxymethyl cellulose lithium salt (CMC—Li salt) having a substitution degree of a hydroxyl group (—OH) by a carboxymethyl lithium group (—CH$_2$COOLi) of 0.7 to 1.5 and has a number average molecular weight of 120×10$^4$ to 350×10$^4$, and the thickening agent is present in an amount of higher than 0.6% by weight and not higher than 1.4% by weight, with respect to the total weight of the negative electrode mix.

2. The negative electrode according to claim 1, wherein the thickening agent is present in an amount of 0.8% by weight to 1.2% by weight, with respect to the total weight of the negative electrode mix.

3. The negative electrode according to claim 1, wherein the negative electrode mix is loaded in an amount of not less than 200 mg/25 cm² and less than 500 mg/25 cm².

4. The negative electrode according to claim 1, wherein the negative electrode mix is loaded in an amount of 300 mg/25 cm² to 400 mg/25 cm².

5. The negative electrode according to claim 1, wherein the substitution degree of the carboxymethyl lithium group is 0.8 to 1.4.

6. The negative electrode according to claim 1, wherein a viscosity of slurry for the negative electrode mix to be applied to the current collector is 500 cps to 10,000 cps when measured at 23°C. and 12 rpm with a B-type viscometer.

7. The negative electrode according to claim 1, wherein the aqueous binder is styrene-butadiene rubber (SBR).

8. The negative electrode according to claim 1, wherein a content ratio of the thickening agent to the aqueous binder on a weight basis is 1:2 to 5:1.

9. The negative electrode according to claim 1, wherein the negative electrode active material is a carbon-based material and the carbon-based material comprises at least one selected from the group consisting of graphite-based carbon, coke-based carbon, soft carbon and hard carbon.

10. The negative electrode according to claim 9, wherein the negative electrode active material is natural graphite and/or artificial graphite.

11. The negative electrode according to claim 1, wherein the negative electrode mix further comprises a conductive material and/or a filler.

12. A secondary battery comprising the negative electrode according to claim 1.

13. The negative electrode according to claim 1, wherein the aqueous binder has a particle size ranging from 200 nm to 400 nm.

* * * * *